June 19, 1973  J. J. DAHLMANS ET AL  3,740,386
PREPARATION OF PEPTIDES
Filed Feb. 18, 1971

INVENTORS
JOHANNES J. DAHLMANS
WILHELMUS H. J. BOESTEN
BY
ATTORNEYS

United States Patent Office 3,740,386
Patented June 19, 1973

3,740,386
PREPARATION OF PEPTIDES
Johannes J. Dahlmans, Maastricht, and Wilhelmus H. J. Boesten, Sittard, Netherlands, assignors to Stamicarbon N.V., Heerlen, Netherlands
Filed Feb. 18, 1971, Ser. No. 116,313
Claims priority, application Netherlands, Feb. 18, 1970, 7002226
Int. Cl. C07c 103/52
U.S. Cl. 260—112.5                            8 Claims

ABSTRACT OF THE DISCLOSURE

The invention provides a process for preparing peptides by reacting a compound containing an amino group having at least one replaceable hydrogen atom with 2-thion-oxazolidone-5 compound derived from an α-aminocarboxylic acid.

---

Figure 1:
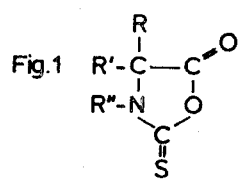
Figure 2:
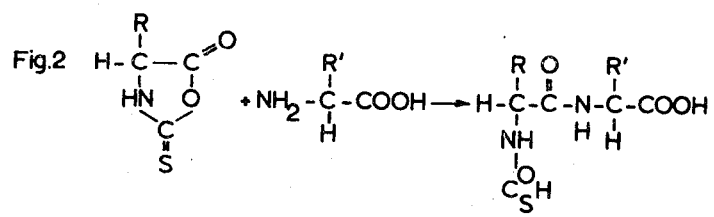
Figure 3:
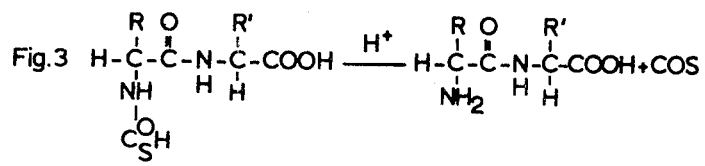

This application is related to our copending U.S. applications Ser. No. 116,311 and Ser. No. 116,312 filed concurrently with this application and entitled "Preparation of Tertiary Alkyl Esters of Alpha(Isothiocyanate Carboxylic Acids" and "Process for the Preparation of 2-Thion-Oxazolidone-5 and Derivatives Thereof," respectively. The entire disclosures of these copending applications are incorporated herein by reference.

The present invention relates to a process for the preparation of peptides and proteins comprising reacting a compound, having an amino group with at least one replaceable hydrogen atom, with the derivative of an α-aminocarboxylic acid, and thereby forming a peptide bond.

Peptides are understood to mean compounds composed of two, three or more amino acids, which are attached to each other by amide groups (peptide bonds). Peptides with a high molecular weight are generally called proteins. The chemical, physical and biological properties of peptides depend among others on the kind and the quantity of the amino acids of which the peptide is composed, and on the sequence in which the amino acids are attached to each other.

For preparing peptides on a large, commercial scale, an efficient synthesis, with a high yield for addition of an amino acid, or a derivative to another amino acid or to a peptide prepared previously is essential. Processes for synthesis of peptides, such as oxytocin, vasopressin and angiotensin, as well as peptides having importance in biochemical research or in the preparation of pharmaceuticals, are known in the prior art. However, in utilizing the prior art processes, the reactants must be pretreated, and the reaction carefully controlled, to accomplish selective reaction whereby one amino group exclusively in one reactant reacts with one, preferably activated, carboxyl group to the exclusion of others in the other reactant.

It has been proposed to have the N-carboxy-anhydride of an α-amino acid or the thiazolid-2-5-dione derivative of an amino acid (sometimes indicated by the less proper name of "N-thiocarboxy-anhydride") react with the free amino group of an α-amino acid or of a peptide (see the U.S. patent applications Nos. 469,310, filed July 2, 1965, and 545,855, filed Apr. 28, 1966). These methods are hereinafter indicated as the NCA method and the TCA method, respectively. The disadvantage of the NCA method is that the reaction proceeds very rapidly, with a reaction time of, for instance, less than 1 minute, which makes it very difficult for the reaction conditions to be fully controlled. As a result of the great reactivity of the N-carboxy-anhydrides, the peptide proper formed during the reaction may also react with the anhydride. Moreover, the N-carboxy-anhydrides of various amino acids cannot be made, or are produced only with a small yield. In the case of the TCA method, the reaction proceeds much more smoothly, but one of the disadvantages of this method is that the thiazolid-2-5-dione derivatives of α-amino acids are produced only by a complex and costly synthesis.

According to the present invention, a peptide is produced by reacting a 2-thion-oxazolidone-5 compound derived from an α-aminocarboxylic acid in an aqueous reaction medium with an amino acid or a peptide, which possess an amino group having at least one replaceable hydrogen atom. Alternatively, the 2-thion-oxazolidone-5 can, according to this invention, be reacted with a compound derived from an amino acid or a peptide, such as an ester or an amide. Further, according to the present invention, the 2-thion-oxazolidone-5 compound can also be reacted with a free amino group of an amino acid or peptide, which is bound to a solid carrier with its C-terminal carboxyl group, according to the principle of the so-called Merrifield peptide-synthesis.

During the process of this invention, a dipeptide or a polypeptide is formed, the terminal amino group of which carries a thiocarbonyl substituent. This N-thiocarbonyl group is easily removed in an acid aqueous medium, with formation of COS and a peptide having a free amino group. Depending on the starting materials and the reaction conditions, the reaction time lies between two minutes and 1.5 to 2 hours. The selectivity of the reaction is excellent, resulting in only one amino acid or peptide being attached, virtually to the exclusion of others to the α-amino carboxylic acid compound. The reaction between a 2-thion-oxazolidone-5- compound tnd an amino acid, for instance, yields exclusively a dipeptide, to the exclusion of formation of a tripeptide. The yield obtained by the process of this invention is excellent; in many cases, by choosing optimum reaction conditions, yields of more than 95% can be achieved.

In the process according to the invention, hereinafter to be referred to as the TOZ method, there is another important advantage being that the 2-thionoxazolidone-5 compounds are made easily and inexpensively. Several α-amino acids, e.g. aspartic acid, cannot, or virtually not, be converted into the corresponding oxazolid-2-5-dione compounds as used in the prior art processes described above, whereas, those α-amino acids can easily be converted to the corresponding 2-thion-oxazolidone-5 compounds to be used in the present process.

As mentioned above, any substituents present in the 2-thion-oxazolidone-5 compound or, for that matter, in the other reactant, which may interfere with the reaction or, under the reaction conditions, may be converted into undesirable groupings, must be protected and inactivated during the reaction. This can be achieved by converting these substituents, prior to the start of present process, into protected groups, or by starting from reactants with protected groups. The protection can be achieved by a variety of well known methods in peptide chemistry, such as the conversion of an amino group into an N-carbobenzoxyamino group, the conversion of hydroxyl- or thiol groups into esters or ethers, for instance into benzyl ethers or thiobenzyl ethers, guanidinine groups can be protected by protonation, and keeping them in protonated condition during the reaction.

The 2-thion-oxazolidone-5 compounds derived from α-amino acids by the present process have the general formula

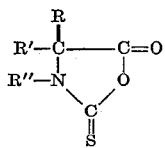

where R represents a hydrogen atom or an amino acid side chain residue, and R′ a hydrogen atom or a lower alkyl group of up to 3 carbon atoms whether or not substituted. An amino acid side chain residue is here understood to mean the groupings whether or not substituted, which may be bound to the α-carbon atom of natural or synthetic α-aminocarboxylic acids, whether or not optically active. In most cases R″ represents a hydrogen atom, but may also represent a lower alkyl group or lower alkylene group of up to 3 carbon atoms which when taken with R forms a ring. Thus, R=R′=R″=H in the 2-thionoxazolidone-5 proper derived from glycine.

Both R′ and R″ represent a hydrogen atom, and R represents an isopropyl group, a propionic acid group, an N-carbobenzoxy-ω-amino-n-butyl group, a benzoxymethyl group or a ω-guanidinine-n-propyl group in the compounds derived from valine, glutamic acid, N-protected lysine, O-protected serine and arginine.

In the 2-thion-oxazolidone-5 compound derived from N-methylleucine, R is an isobutyl group, R′ a hydrogen atom and R″ a methyl group. In the compounds derived from proline or from O-protected hydroxyproline, R′ is a hydrogen atom, while R and R″, together, form a trimethylene- or a 1-benzoxytrimethylene group.

The above examples represent only a few of the many 2-thion-oxazolidone-5 compounds which can be used in the peptide synthesis according to the process of the present invention.

The 2 - thion - oxazolidone - 5 compounds can be prepared with high yields by converting a tertiary alkyl ester of an α-aminocarboxylic acid with thiophosgene into the corresponding α-iisothiocyanate carboxylic acid ester and by de-esterifying and cyclize the latter with the aid of a strong acid (see our copending applications Ser. No. 116,311 and Ser. No. 116,312 mentioned above for further details). Also the derivatives of the so-called "difficult" amino acids, such as glutamic acid, asparagine, histidine or arginine, can be prepared in this way. A closely related synthesis can be used, in which a trialkylsilylester of an α-aminocarboxylic acid is converted by way of the α-isothiocyanate carboxylic acid trialkylsilyl ester into an 2-thion-oxazolidone-5 compound.

With all these 2-thion-oxazolidone-5 compounds, the α-amino group of the original amino acid is masked and the carboxyl group activated. The reaction, in which the peptide bond is formed, and the dethiocarboxylation reaction are believed to follow the following reaction equations.

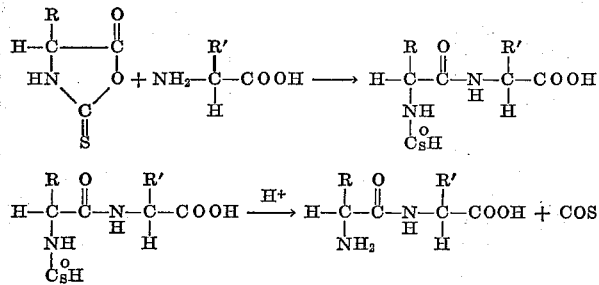

where R and R′ represent amino acid side chain residues.

The peptide synthesis according to the process of the present invention is carried out in an aqueous medium, the pH of which is regulated during the reaction. pH control is achieved by starting from an aqueous buffer solution and by continuously adjusting the pH after the addition of the reactants and, during the reaction, by the addition of alkaline materials or acid as needed. The choice of the pH at which the reaction is effected depends on several factors. Low pH values, for instance, at which the N-thiocarboxyl group may split off during the reaction from the peptide formed, are avoided. If certain groups must be protonated during the reaction and are to remain in that condition, this will also require a particular pH to be chosen. The pH value to be preferred ultimately can be determined by conducting a few simple tests prior to the reaction. In general, the best results are achieved at a pH of between 8 and 12. If necessary, other pH values can be used.

During the reaction, the reaction mixture is intensively stirred in order for both the reactants and the pH-controlling agents to be distributed as uniformly as possible.

Upon completion of the reaction, the pH is decreased to a pH of between 1 and 5, by the addition of a strong acid, for instance. The terminal amino group of the peptide which is formed is then dethiocarboxylated, with liberation of COS. The removal of the COS may, if necessary, be accelerated by passing a flow of inert gas through the reaction mixture.

The temperature at which the reaction is carried out may be varied between −25° C. and +50° C. To be able to use an aqueous solution without being troubled by the formation of ice, salt which does not interfere with the reaction may be added to the reaction mixture. By the addition of a large quantity of sodium chloride, it is possible for the reaction to be carried out at −25° to −30° C. Preferably, however, the reaction is effected at a temperature of between −15° C. and 0° C.

The ratio between the reactants may vary. One of the reactants may be added in a, usually slight, excess quantity. In that case, the cheapest reactant, or the one that can be removed in the easiest way from the solution upon completion of the reaction, is applied in excess quantity. However, preference is given to starting with equimolecular quantities of the reactants.

The reaction can be accomplished by first dissolving an amino acid or peptide in an aqueous buffer solution, and subsequently adjusting the pH of the solution to the value desired and adjusting the solution to the proper temperature. If necessary, salt can be added to prevent the formation of ice. Next, the 2-thion-oxazolidone-5 compound is added with intensive stirring, while maintaining the pH of the solution at the proper value with the aid of an automatic titrator, which supplies alkaline material to the reaction medium as needed. Upon completion of the attaching reaction, the solution is acidulated by the addition of a strong acid, to free the terminal amino group of the peptide group.

The peptide formed can be isolated by a well known process from the peptide chemistry. The peptide may also be left in the solution and serve as starting material to effect a bond with a following amino acid according to the TOZ method. In this way, large peptides can be prepared efficiently by continuously attaching a new amino acid to the terminal amino group of the peptide formed.

Another advantage of the TOZ method is that the racemization percentage, both in the preparation of 2-thion-oxaolidone-5 compounds and in the attaching and processing reaction, can be kept at a very low level.

The process of the present invention will be further described by the following examples relating to the preparation of dipeptides, as the dipeptide formation is the most fundamental step; the continuous attaching of a new amino acid to a peptide previously prepared can be carried out by repeating the same process.

EXAMPLE 1

The preparation of leucyl-valine

In an aqueous buffer solution having a pH of 12, 2.35 g. of valine (0.02 mole) were dissolved. Subsequently, the pH was adjusted to 11.5 and 3.5 g. of 4-isobutyl-2-thion-oxazolidone-5 (0.02 mole) was added to the solution in small portions, at a temperature of between $-2°$ C. and $0°$ C., with vigorous stirring. The pH of the reaction mixture was kept at a value of 11.5 for 10 minutes with the aid of an automatic titrator, which supplied a 5 N solution of caustic soda. The reaction mixture was then adjusted to a pH of 2 by the addition of 6 N hydrochloric acid. Following filtration and processing in the way usual for the peptide chemistry, 3.3 g. of pure leucyl-valine were obtained.

EXAMPLE 2

The preparation of phenylalanyl-leucine

In a buffer solution having a pH of 10, 2.65 g., of leucine (0.02 mole) were dissolved, and the pH of the solution was then adjusted to 9.5. At a temperature of $5°$ C., and with vigorous stirring, 4.2 g. of 4-benzyl-2-thion-oxazolidone-5 (0.02 mole) was added to the solution in small portions. The pH of the reaction mixture was maintained at a value of 9.5 for 1.5 hours by adding a 2 N solution of caustic soda when needed. The mixture was then adjusted to a pH of 2 and a solution was obtained in which phenyl-alanyl-leucine accounted for 95 mol.-percent of the quantity of amino acids and peptides present in the solution, as calculated by means of an amino acid analysis. The effiiciency, based on either one of the reactants, was slightly higher than the yield expressed above.

EXAMPLE 3

The preparation of valyl-leucine

In a buffer solution having a pH of 10.0, 2.65 g. of leucine (0.02 mole) was dissolved and the pH of the solution was then adjusted to 10.2. To the intensively stirred solution, which was maintained at a temperature of $0°$ C., 3.2 g. of 4-isopropyl-2-thion-oxazolidone-5 (0.02 mol) was added. The reaction mixture was maintained at a pH of 10.2 for 1 hour, whereupon the mixture was adjusted to a pH of 2. Valyl-leucine was obtained with a yield of 92 mol-percent of the amino acids and peptides present in the solution, as was calculated by an acid analysis.

EXAMPLE 4

The preparation of asparagyl-valine, starting from aspartic acid and valine

Aspartic acid was converted by reacting with isobuten into the di-tertiary butyl ester. The di-tertiary butyl ester of aspartic acid was then reacted with thiophosgene in a reaction medium comprising methylene chloride and water in a ratio of 1:1. The reaction medium was maintained at a temperature of $0°$ C. and a pH of 4 and the reaction allowed to proceed for 1 hour. The organic phase was then separated from the water layer and dried by contact with water-free sodium sulfate. A solution of the di-tertiary butyl ester and α-isothiocyanate aspartic acid in dry methylene chloride was obtained.

Gaseous HCl was passed through this solution for 2½ hours, at a temperature of $-5°$ C. The solution was then filtered and the methylene chloride removed by distillation. The resulting residue was recrystallized in a mixture of methylene chloride and hexane and pure 4-carboxyl-methyl-2-thion-oxazolidone-5 was obtained.

In an aqueous buffer solution, 2.35 g. of valine (0.02 mole) was dissolved, and the pH of the solution then adjusted to a value of 9.5. To this solution which is vigorously stirred and kept at a temperature of $0°$ C., 3.5 g. of the 4-carboxylmethyl-2-thion-oxazolidone-5 (0.02 mole) previously prepared was added. This reaction mixture was maintained at a pH of 9.5 for half an hour, whereupon the mixture was adjusted to a pH of 2. Asparagyl-valine was obtained with a yield of 90%.

EXAMPLE 5 TO 21 INCL.

The preparation of leucyl-valine

Using the procedures described in Example 1, equimolecular quantities of valine and 4-isobutyl-2-thion-oxazolidone-5 were reacted at various temperatures and pH values, whereupon, by acidulation, the leucyl-valine was obtained. In the table the reaction conditions and the yields obtained thereby are summarized, the yield again being expressed as the mol-percent of the amino acids and petides present in the solution

| No. | Temp. in ° C. | pH | Reaction time in min. | Yield in percent |
|---|---|---|---|---|
| 5 | 5 | 9.5 | 75 | 93 |
| 6 | 5 | 9.5 | 45 | 92 |
| 7 | 0 | 11.0 | 5 | 78 |
| 8 | 0 | 8.3 | 60 | 85 |
| 9 | −8−0 | 11 | 3 | 86 |
| 10 | −4−0 | 11 | 8 | 84 |
| 11 | −2−0 | 11 | 8 | 83 |
| 12 | −2−0 | 11 | 45 | 83 |
| 13 | −2−0 | 11.5 | 3 | 68 |
| 14 | −4−0 | 11.5 | 6 | 69 |
| 15 | +25 | 11.5 | 8 | 44 |
| 16 | −9−0 | 12 | 8 | 41 |
| 17 | −5−4 | 11 | 15 | 78 |
| 18 | −13−−10 | 11 | 30 | 83 |
| 19 | −13−−10 | 10.5 | 35 | 87 |
| 20 | −15−−13 | 11.0 | 30 | 75 |
| 21 | −15−−10 | 10.0 | 60 | 93 |

EXAMPLE 22

The preparation of asparagyl-phenylalanine-methyl ester

In an aqueous buffer solution, 4.3 g. of hydrochloric acid salt of the methyl ester of phenylalanine (0.02 mole) were dissolved at a temperature of $-15°$ C. and the pH of the solution then adjusted to a value of 9.0. To this solution, 3.5 g. of 4-carboxylmethyl-2-thion-oxazolidone-5 (0.02 mole) were added, with vigorous stirring. The pH of the solution was maintained at a value of 9.0 and a temperature at $-15°$ C. for half an hour. Subsequently, the mixture was rapidly adjusted to a pH of 2. By further working up the solution in a conventional fashion, the methyl ester of asparagyl-phenylalanine was obtained, the purity of which was demonstrated with the aid of thin-layer chromatography. This compound is useful as a sweetening agent.

What is claimed is:

1. A process for the preparation of a peptide by reacting a 2-thion-oxazolidone-5 compound derived from an α-amino carboxylic acid in an aqueous medium at a temperature between $-25°$ C. and $+50°$ C. with a compound having an amino group with at least one replaceable hydrogen atom selected from an α-amino carboxylic acid, a peptide, or with a compound derived from an α-amino carboxylic acid or a peptide.

2. A process according to claim 1, wherein the reaction medium is maintained at a pH of between 8 and 12 whereby a peptide with an N-thiocarboxyl-amino terminal group and the thiocarboxyl group is subsequently removed therefrom by decreasing the pH.

3. A process according to claim 1, wherein the reaction is carried out at a temperature of between $-15°$ C. and $0°$ C.

4. A process according to claim 2, wherein the reaction, is carried out at a temperature of between $-15°$ C. and $0°$ C.

5. A process according to claim 1, wherein the pH of the reaction mixture is first kept at a value of between 8 and 12 and the reaction mixture is subsequently adjusted to a pH below 5.

6. A process according to claim 3, wherein the pH of the reaction mixture is first kept at a value of between 8 and 12 and the reaction mixture is subsequently adjusted to a pH below 5.

7. A process according to claim 2, wherein the pH of the reaction mixture is first kept at a value of between 8 and 12 and the reaction mixture is subsequently adjusted to a pH below 5.

8. The process according to claim 4, wherein the pH of the reaction mixture is first kept at a value of between 8 and 12 and the reaction mixture is subsequently adjusted to a pH below 5.

References Cited

Chemical Abstracts, vol. 70 (1969), Par. 29, 305J.
Chemical Abstracts, vol. 73 (1970), Par. 33, 766p.

ELBERT L. ROBERTS, Primary Examiner